No. 735,414. PATENTED AUG. 4, 1903.
A. H. SCHERZER & C. F. T. KANDELER.
BASCULE BRIDGE.
APPLICATION FILED NOV. 22, 1901.
NO MODEL. 5 SHEETS—SHEET 1.
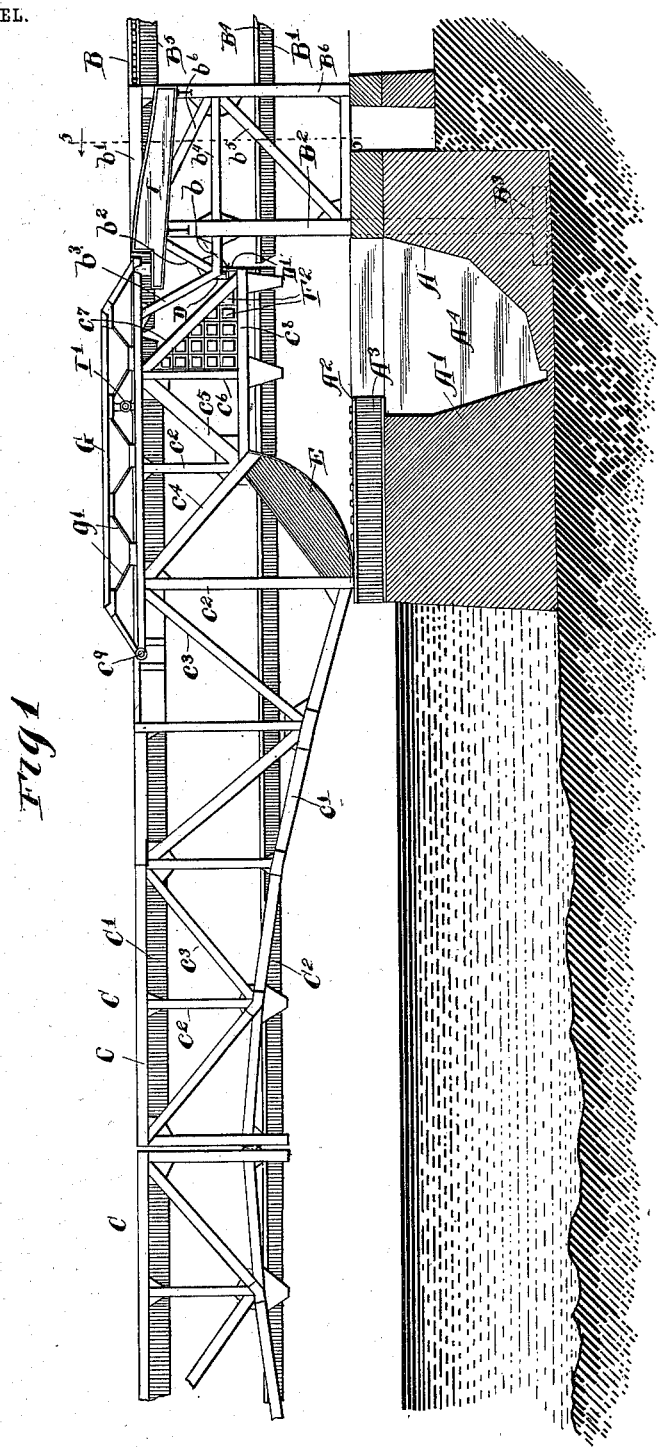
Witnesses:
Carl H. Crawford
Gertrude Bryce
Inventors
Albert H. Scherzer
Charles F. T. Kandeler
by Poole & Brown
their Attorneys

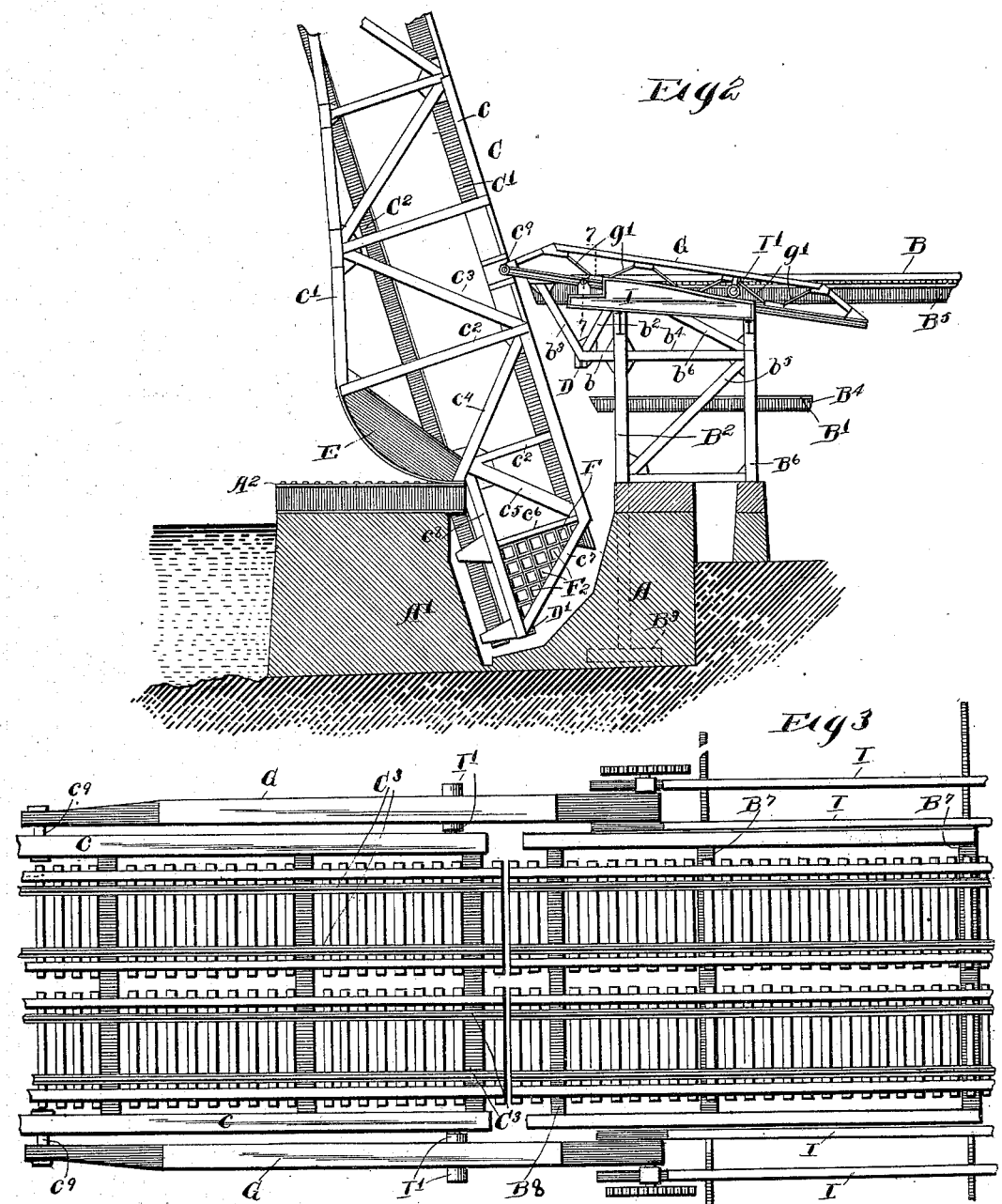

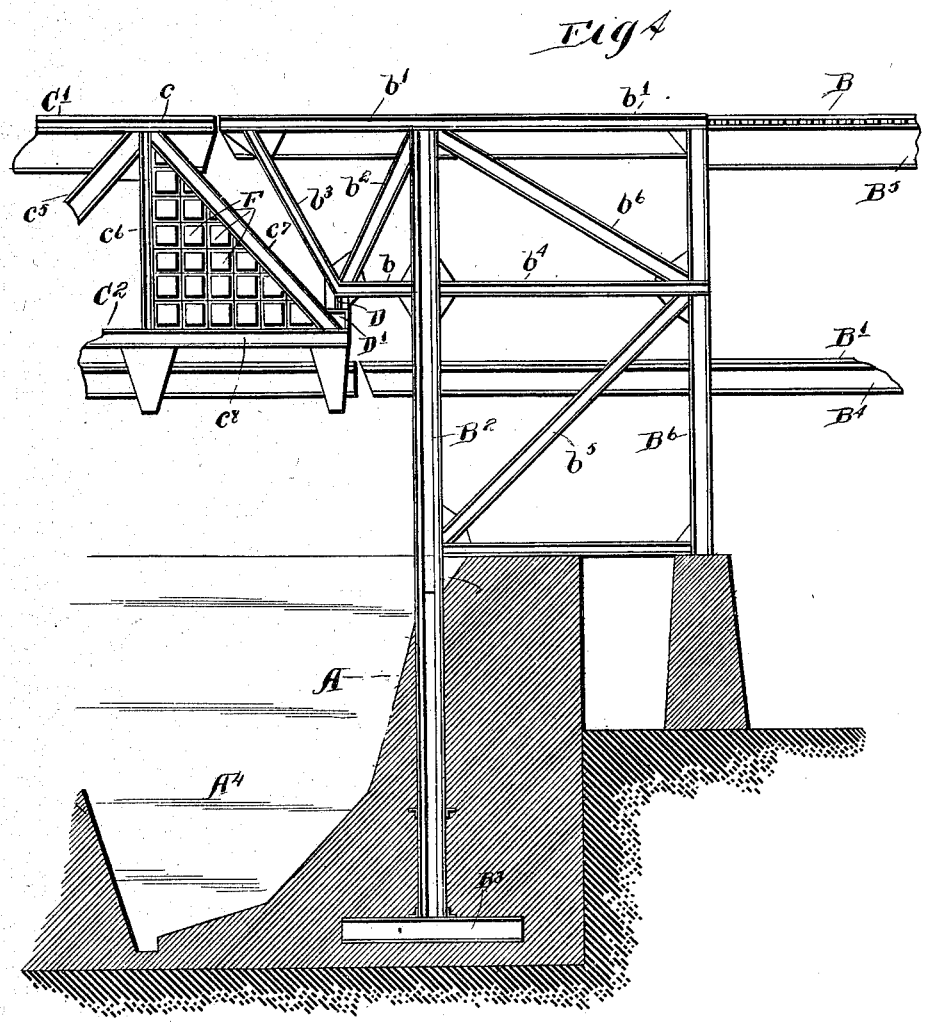

No. 735,414. PATENTED AUG. 4, 1903.
A. H. SCHERZER & C. F. T. KANDELER.
BASCULE BRIDGE.
APPLICATION FILED NOV. 22, 1901.
NO MODEL. 5 SHEETS—SHEET 4.
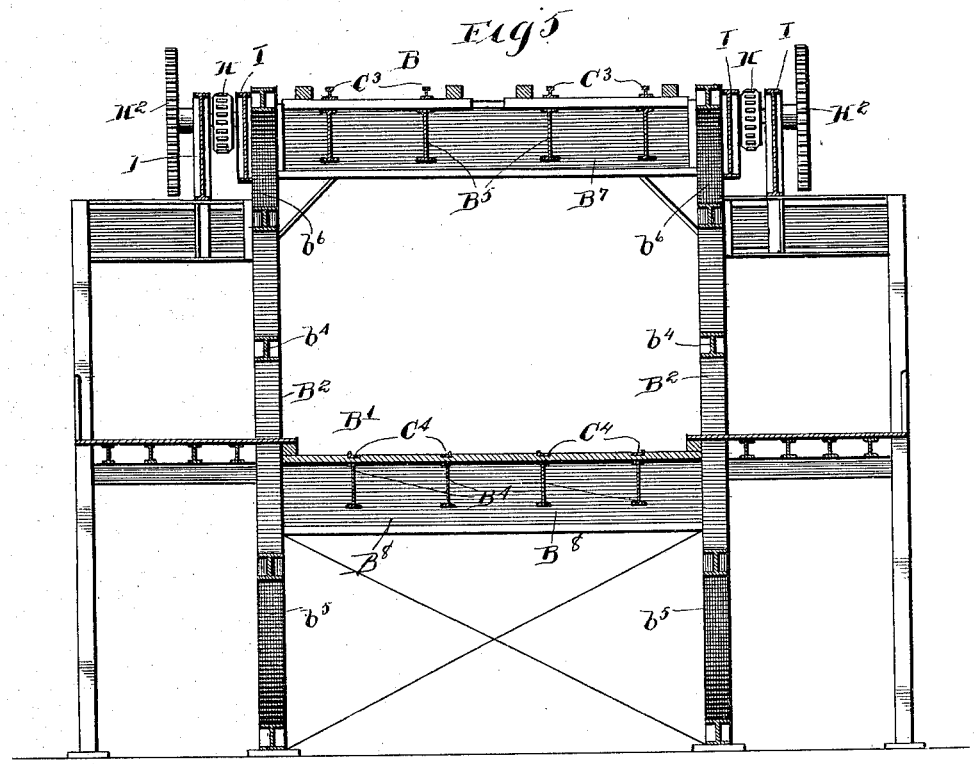
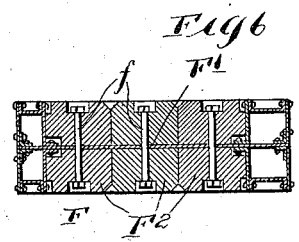
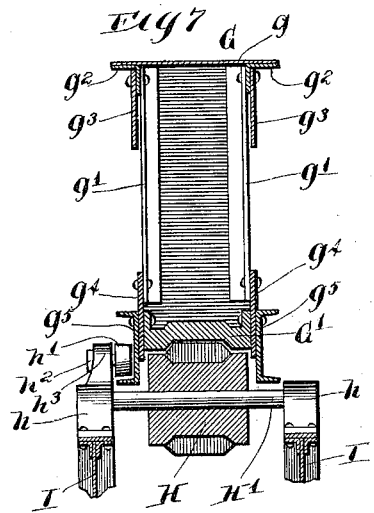

No. 735,414. PATENTED AUG. 4, 1903.
A. H. SCHERZER & C. F. T. KANDELER.
BASCULE BRIDGE.
APPLICATION FILED NOV. 22, 1901.
NO MODEL. 5 SHEETS—SHEET 5.
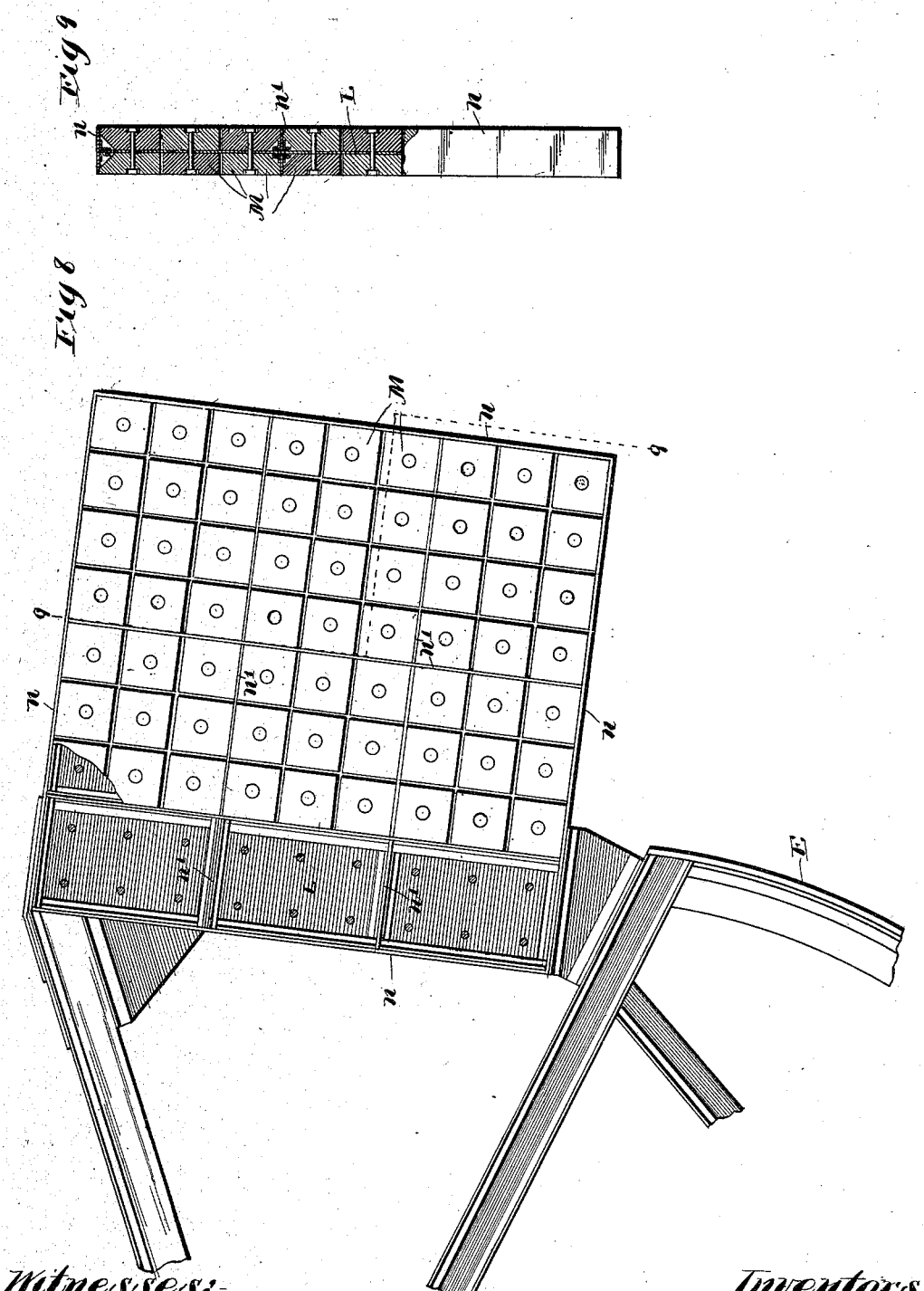
Witnesses:
Carl M. Crawford
George R. Wilkins
Inventors
Albert H. Scherzer
Charles F. T. Kandeler
by Poole & Brown
their Attorneys No. 735,414. Patented August 4, 1903.

UNITED STATES PATENT OFFICE.

ALBERT H. SCHERZER AND CHARLES F. T. KANDELER, OF CHICAGO, ILLINOIS, ASSIGNORS TO THE SCHERZER ROLLING-LIFT BRIDGE COMPANY, OF CHICAGO, ILLINOIS, A CORPORATION OF ILLINOIS.

BASCULE-BRIDGE.

SPECIFICATION forming part of Letters Patent No. 735,414, dated August 4, 1903.

Application filed November 22, 1901. Serial No. 83,248. (No model.)

*To all whom it may concern:*

Be it known that we, ALBERT H. SCHERZER and CHARLES F. T. KANDELER, of Chicago, in the county of Cook and State of Illinois, have invented certain new and useful Improvements in Bascule-Bridges; and we do hereby declare that the following is a full, clear, and exact description thereof, reference being had to the accompanying drawings, and to the letters of reference marked thereon, which form a part of this specification.

This invention relates to improvements in bascule-bridges, and it embraces features of construction in a double-decked bridge, improvements in the mechanism for actuating the span or leaf of a bascule-bridge to open and close the same, an improved construction in and arrangement of counterbalance-weights for the leaf, and other features of construction in bascule-bridges.

Some of the novel features of the invention are more especially applicable to bascule-bridges of that class wherein the bridge is opened and closed by a rolling movement of the span or leaf—such, for instance, as shown in United States Letters Patent No. 511,713, issued to William Scherzer December 26, 1893—but other features thereof are adapted for use in connection with bascule-bridges of other kinds.

As shown in the drawings, Figure 1 is a view, principally in side elevation, of one leaf of a rolling lift-bridge and its associated approach, showing also the inner or lifting end of an adjacent leaf. Fig. 2 illustrates, principally in side elevation, the abutment end of one of the leaves of the bridge in its elevated or open position and part of the approach, illustrating also the mechanism for swinging the leaf. Fig. 3 is a plan view, on an enlarged scale, of the adjacent parts of the approach and bridge-leaf. Fig. 4 is an enlarged view showing the abutment end of the two decks of one of the leaves and the adjacent end of the upper and lower approach-roadways, showing the pier in vertical section. Fig. 5 is a transverse vertical section taken on line 5 5 of Fig. 1. Fig. 6 is a transverse sectional detail of one of the counterbalance-weights. Fig. 7 is a transverse section on line 7 7 of Fig. 2. Fig. 8 is a view in side elevation of a counterbalance-weight for a bascule-bridge. Fig. 9 is a sectional view thereof taken on line 9 9 of Fig. 8.

As shown in said drawings, A A' designate the shore or abutment piers of the bridge, said piers being built of masonry or constructed in any other suitable manner to afford a stationary support for the movable leaf of the bridge. Above the pier A are the two approach-floors B B', which meet the shore ends of the two decks of the bridge.

$B^2$ $B^2$ are anchored columns, on which the end of the upper approach-floor is supported. As herein shown, the lower approach-floor is also supported by said columns; but this is merely incidental to the special bridge illustrated, wherein the lower approach-roadways are also formed by floors supported above the level of the shore piers or abutment. Manifestly the said lower approach-floors may rest on or be formed by the surface of the ground at the bridge-approach. $B^6$ $B^6$ are other columns forming part of the approach structure and which serve as supports for the upper and lower approach-floors. The lower ends of said columns $B^2$ $B^2$ extend into the abutment-piers, said lower ends of the columns being shown as secured to anchor-plates or "crabs" $B^3$, embedded in said piers.

C C designate as a whole the movable spans or leaves of the bridge, each of which rests at its outer or shoreward end upon the abutment-piers A A'. Said spans are shown as of trussed construction, and they are provided with two decks or bridge-floors $C'$ $C^2$, located between and supported by the trusses. On the upper deck or floor $C'$ may be supported the rails $C^3$ of a railway-track, while the lower deck or floor may be adapted for the use of vehicles and street-cars, said lower deck being shown as provided with the rails $C^4$ of a street-railway. The construction of the floor-frames for the upper and lower decks or floors may be of any familiar or preferred type and is not herein shown in detail. The framework of the leaves consists, as herein shown, of two lateral trusses, each consisting of straight top chords $c$ and curved bottom chords $c'$, said bottom chords curving downwardly toward the abutment end of the span and being connected by vertical and oblique braces or truss members $c^2$ and $c^3$.

E E designate rolling segments, which are attached to the trusses at the abutment end of the span and are adapted to rest and roll on stationary supporting-surfaces. As shown in the drawings, said rolling segments have the form of sector-shaped beams, which are arranged obliquely and are secured at their upper ends to the lower ends of radial braces $c^4$ and at their lower ends to the lower ends of the vertical truss members $c^2$ at the abutment ends of the trusses, as well as to the adjacent ends of the bottom chords $c'$ of the trusses. Said rolling segments rest and roll on horizontal supports $A^2$, herein shown as having the form of girders, which rest on the abutment-piers $A'$ $A'$. The curved faces of the rolling segments are provided with holes or recesses, and the supports $A^2$ $A^2$ are provided with teeth or projections, which extend upwardly from the top surface thereof and engage the said holes or recesses to prevent the rolling segments from sliding or moving endwise on said supports, this feature being shown in the prior Scherzer patent above referred to. In the particular form of bridge shown in the accompanying drawings the lower deck or floor is located considerably above the level of the supports $A^2$ $A^2$ for the rolling segments, so that the rolling segments are located principally below the level of the said lower deck or roadway. The shore ends of the trusses are, moreover, extended beyond the said segments, so as to form rigid arms or projections which carry counterbalance-weights (indicated by F) and are also adapted for contact at their ends with downwardly-facing stationary stops D D on the bridge approach or abutment for the purpose of positively limiting the descent of the free end of the span, or, in other words, to prevent the free end of one span of a double-span bridge, such as is shown, from descending below its horizontal or normal position. Such stationary stops D D are herein shown as attached to the columns $B^2$ $B^2$, hereinbefore referred to, said columns being anchored in the abutment, as hereinbefore described, to enable them to withstand the upward stress or pull due to the weight of the free end of the span and the load thereon. It is not to be understood, however, that the said stops in the case of a double-span bridge carry the entire stress or strain due to the load on the bridge, for the reason that in a bridge in which the meeting ends of the two spans are elevated considerably above the supporting-surfaces for the rolling segments the fact that the rolling segments are held from outward movement on said supporting-surfaces and the free ends of the spans are in abutting contact results in the spans supporting each other in the manner of an arch, as set forth in said prior Scherzer patent. Manifestly in the case of a single-span bridge the free end of the span may rest upon and be supported by a pier or abutment.

One feature of our invention relates to the construction by which the ends of the two decks or floors of a double-decked bridge-span are adapted to meet or join the upper and lower approach floors or roadways. The said bridge-floors in the construction shown, like the single floor shown in the said prior Scherzer patent, extend outwardly or shoreward past the rolling segments, so that the ends of said bridge-floors which meet the approach floors or roadways descend or swing downwardly from the latter as the free end of the span rises in opening the bridge. The said ends of the bridge-floors, therefore, both follow curved paths, due to the bodily movement of the span in the movement of the rolling segments on their supports. The said ends of the bridge-floors are not, however, extended the same distance past or beyond the rolling segments; but the lower floor extends a greater distance beyond the said segments than the upper floor, while in the case of the approaches the upper approach floor or roadway extends past or overhangs the lower one. The extent of such overhang is such that the end of the upper bridge-floor in its descent will clear the end of the lower approach-floor. In other words, the end of the lower bridge-floor which meets the lower approach-floor projects beyond the adjacent end of the upper bridge-floor such distance that the curved path of the said end of the upper floor will pass or fall outside of the end of the lower approach-floor. As a result of this construction the ends of both bridge-floors will be brought into proper end to end relation with the corresponding approach-floors when the bridge is lowered, while at the same time in the lifting of the bridge the descending end of the upper bridge-floors will pass so far outside of the lower approach-floor as to entirely clear the same. In the construction illustrated the approach-floors are formed mainly by longitudinal beams or girders, those of the lower approach $B'$ being indicated by $B^4$ and those of the upper approach B by $B^5$, and the outer ends of said beams are supported from the columns $B^2$ $B^6$ by transverse girders $B^7$ $B^8$. In this construction the girders $B^4$ of the lower roadway extend only a short distance outside of the said columns $B^2$, while the girders $B^5$ of the upper approach extend therefrom a considerably greater distance and are supported by a transverse girder $B^9$, the ends of which are supported by a truss structure comprising lower longitudinal horizontal beams $b$, attached to and extending outwardly from the said columns $B^2$, horizontal upper beams $b'$, attached to the upper ends of the posts $B^2$ $B^2$ and of the companion parts of the approach structure, oblique beams $b^2$ $b^2$, which extend downwardly and outwardly from the upper ends of the posts $B^2$ $B^2$ to the outer end of the lower horizontal beams $b$, and oblique braces or struts $b^3$ $b^3$, which extend from the outer ends of the beams $b$ $b$ upwardly and outwardly to the outer ends of the upper beams $b'$ $b'$, and said oblique struts $b^3$ are rigidly attached at their lower ends to the beams $b^2$, at their upper ends to the ends of the transverse girders $B^3$. The truss structure formed by the beams and struts $b$, $b'$, $b^2$, and $b^3$ also serves as a means for rigidly supporting the downwardly-facing stops D D from or upon the anchored columns $B^2$ $B^2$. Additional stiffness and rigidity is given to the truss structure last described by means of horizontal girders $b^4$ $b^4$, which extend from the columns $B^2$ to the columns $B^6$ in alinement with the horizontal beams $b$ $b$ and by oblique beams $b^5$ $b^6$, extending from the lower and upper ends of the columns $B^2$, to the ends of the said beams $b^4$ at the points where the same are attached to the columns $B^6$. The end portions of the bridge-floors which meet the approach-floors are supported by the outwardly-projecting parts of the span-trusses which extend beyond the rolling segments. In the particular construction illustrated, wherein, as before stated, the lower chords are curved downward at the ends of the span and the rolling segments are mainly below the level of the lower bridge-floor, said extension of the trusses are formed by oblique and upright truss members $c^5$, $c^6$, and $c^7$, by extensions of the top chords $c$, and by horizontal truss members $c^8$, which extend outwardly from the upper ends of the rolling segments and from the lower chords of the truss extensions. In this arrangement of the trusses the lower deck is located at the level of the horizontal truss members $c^8$ $c^8$ and the upper deck is located at the level of the top chords $c$. Moreover, the upper deck terminates near or slightly beyond the ends of the upper chords, while the lower deck, which projects beyond the upper one, terminates about at the ends of the horizontal truss members $c^8$, the external or end truss member $c^7$ being inclined and extending from the end of the said top chord $c$ to the end of the said horizontal truss member $c^8$. Inasmuch as the projecting part of the span formed by the truss extensions described and the bridge-floors in the opening of the span descend below the level of the supporting-girders $A^2$ $A^2$, if said girders be near the surface of the water in a waterway or near the surface of the ground it will be necessary to provide a space or well to receive the same, such a space or well being shown in the drawings at $A^4$ and as formed between the abutment-piers A and $A^4$.

Referring to the stationary stops D D for limiting the closing movement of the span, the same are located in the same planes with the trusses, are arranged to face downwardly, and coact with upwardly-facing stops D' D' on the ends of the projections of the span-trusses. As before stated, said stops D D are attached to the truss structure formed on the approach to support the overhanging end of the upper approach-floor, being attached to the outer ends of the lower horizontal beams $b'$ in line with the oblique braces $b^2$. The movable stops D' D' are located near the level of the lower bridge-floor, being attached to and rising from the ends of the horizontal truss members $c^8$ $c^8$. By this arrangement described said stationary stops D D are rigidly connected with the anchored posts, the said oblique braces, which extend from said stops upwardly to the tops of the columns $B^2$, serving to transmit directly to the columns the upward thrust or stress coming on the stops. The attachment of the said stops to the columns is also made stronger by the oblique struts $b^3$, which reach to the overhanging end of the approach-floor and are connected with the girders constituting the same. The stops D' D' on the span are attached both to the horizontal truss members $c^8$ and to the oblique members $c^7$, so that they have strong and rigid connection with the main parts of the span-trusses.

As hereinbefore stated, the counterbalance-weights F F are attached to the parts of the trusses which extend beyond the rolling segments E E. Said counterbalance-weights embrace novel features of construction, constituting a part of my invention, as follows:

F', Fig. 6, indicates a flat sheet-metal plate which is made of a size and shape to engage and is secured at its margins to the outermost oblique, vertical, and horizontal members $c^6$, $c^7$, and $c^8$ of the truss extensions in the manner shown in Fig. 6. Said truss members are shown as longitudinally divided or each made of two parts, between which the margins of the plate F' are inserted and secured.

$f^2$ $f^2$ designate separate, small, or individual counterweight-blocks, of which there are two sets, one set located on each side of the plate F'. Each set more or less completely fills the space between the inclosing beam and truss members, according to the number of blocks needed. Said blocks are attached to the plate by means of bolts $f$, which pass through the weights and through said plate. Desirably the weight-blocks are provided at the ends of the holes through which the bolts pass with recesses, in which are located the heads and nuts of said bolts.

The supporting-plates F' for the counterbalance-weights constitute, in effect, parts of the trusses, adding strength to said trusses and taking up no room or space additional to that required for the parts which constitute said trusses. A counterbalance-weight of sectional construction or consisting of a number of smaller units is, furthermore, elastic, or, in other words, may be made heavier or lighter, so that if a given counterbalance-weight becomes too heavy or too light for the purpose desired one or more individual weights may be removed or added.

Next referring to my improvements in the actuating mechanism for the bridge leaf or span whereby the same is opened and closed, G G, Fig. 7, designate endwise-movable operating-struts, which are located one laterally outside of each truss member and pivoted on laterally-directed horizontal pins $c^9$ on the top chords of the trusses. One of said operating-struts is shown in detail in Fig. 7, and consists of a lower bar or member G', provided with downwardly-facing rack-teeth and a longitudinal upper member $g$, which is connected with the lower member by means of oblique braces or tie-bars $g'$. Said braces $g'$ are attached at their upper ends to angle-bars $g^2$, constituting part of the upper member $g$. The lower ends of said braces $g'$ are attached to tie-plates $g^4$, which latter are secured at their lower margins between the lower member G and channel-bars $g^5$, which are located at the sides of said lower member. The rack-teeth of each of said operating-struts mesh with a toothed pinion H, which is affixed to a rotative shaft H', mounted in bearings $h$ attached to the upper margins of two vertical laterally-separated guide-girders I I. Said guide-girders are supported on the upper ends of the columns $B^2$ and $B^6$, one pair at each side of the approach structure, as shown in Fig. 3. The operating-strut is adapted to move outwardly between said guide-girders I when said strut is shifted rearwardly to raise the leaf of the bridge, and said strut is provided at the sides thereof with rollers I', which rest and travel on the upper edges of said guide-girders. The rollers I' are provided for the purpose of taking part of the weight of the operating-strut when the latter is at its outermost position or at the time the leaf of the bridge is raised, as shown in Fig. 2, to prevent too great a weight coming upon the actuating-pinion H. When the leaf is in its closed or lowermost position, the weight of the operating-strut is taken by the pivot-pins $c^9$ and the actuating-pinions, and when the leaf is in its open position said weight is transferred to the said actuating-pinion and the guide-rollers I'.

It will be noted that the operating-struts are pivoted to the trusses of the bridge-leaf a distance in advance of the innermost part of the rolling segments E, on which the bridge rests and rolls or nearer the free end of the span than the lower ends of said segments. This construction is of considerable practical advantage, as it increases the purchase or efficiency of the operating-struts and enables the same to more easily control the movements of the span than if connected with said leaf at points concentric with respect to said segments. Manifestly by this location of the pivot-pins when the span is raised, as seen in Fig. 2, the pivoted ends of said struts are brought to a considerable distance above the supporting-girders and much higher than they would be if arranged concentrically of the rolling segments, the result being that the span may be held against being moved or swung on its rolling supports by wind-pressure and may be moved when subject to such wind-pressure without the use of such a strong or powerful actuating device, as would be necessary if such actuating devices acted on the span at a point concentric with the rolling segments or above the same when the span is in its horizontal position. The upper margins of said guide-girders I are made of a form to correspond to the movement of said operating-strut caused by the opening and closing movements of the bridge-leaf as it rolls backwardly or forwardly. If the pivot-pin $c^9$, connecting the operating-strut with the span, were located concentrically with respect to the curved surfaces of the rolling segments, said pivot-pin would move horizontally and the operating-strut would move endwise in a horizontal plane. Said pivot-pin $c^9$ is, however, as before stated, located nearer the free end of the span than the forward end of the rolling segment and is therefore located eccentrically with respect thereto, with the result that it rises or falls as the span is lifted or lowered, and the rear end of the operating-strut has a correspondingly irregular movement. The curved upper edges of the guide-girders are shaped to conform to the path of the guide-rollers I', due to such irregular movement of the operating-strut. The pinion-shafts H' each extend at one end beyond the bearings thereof and are provided outside said bearing with a gear-wheel $H^2$, which is adapted for intermeshing engagement with any suitable driving-gear mechanism (not shown) for giving motion to the pinion H. The weight of the operating-strut is sufficient to normally prevent the same from rising during the lifting and closing movements of the span; but in order to prevent said strut from rising or getting out of mesh with its gear-pinion under extraordinary strains or stresses we have herein shown guide-pulleys $h'$, which are rotatively mounted on short shafts $h^2$, fixed in bearings $h^3$, rising from the bearings $h$ of the axle H, said pulleys extending inwardly over the lower flanges of the channel-plates $g^5$ in position to engage said flanges, and to thereby prevent the actuating member from rising.

In Figs. 8 and 9 we have illustrated a construction in a counterbalance-weight embracing the same general features of construction hereinbefore described, but in which the web-plate, by which the individual weights, counterweight-blocks, or weight-units are supported, instead of being secured at its margins to the members of the truss itself is stiffened by flanges or frame members and is merely attached to the truss. As shown in said Figs. 8 and 9, L indicates a web-plate, and M individual counterweight-blocks attached to the same by bolts $l$, passing through the blocks and through holes in the said plate L. The counterweight-blocks are made of like shape and are arranged for contact with each other at their side faces, so as to completely fill the area of the web-plate, thereby affording a maximum of weight in a minimum space. Such blocks may be made of iron or preferably of a heavier metal—such, for instance, as is used for window-sash weights. Some of the blocks may be made of less thickness than others in order to enable the total weight of the blocks to be varied without shifting the center of gravity of the counterbalance-weight to the same extent as would result if a portion of the blocks were entirely omitted. The plate L is provided with marginal stiffening-flanges N, constituting, in effect, a marginal frame which serves to stiffen and support the plate. Said plate is shown as made of rectangular form and the marginal flanges as consisting of flat bars or plates $n\ n$, secured to each other at the corners of the frame and attached to the edges of the plate L, so as to project from both faces of the same in such manner as to form two shallow boxes. The said plate L is in the instance illustrated in Figs. 8 and 9 attached to the inner or shore end of one of the trusses of a lift-bridge of the "through" type, the marginal flange or frame thereof being attached to the upper end of the rolling segments O by a connecting-piece $o$ and connected with the upper chord of the truss by means of an oblique truss member $O'$. In this construction manifestly the web-plate L is merely attached to the truss, while in the construction shown in Figs. 1 to 6 the web-plate is attached at its margins directly to the truss members and constitutes a part of the truss. In both instances, however, the frame or truss members to which the edges of the plate are attached serve to support or stiffen the plate. In said Figs. 8 and 9 the web-plate L is shown as provided between the marginal flanges $n\ n$ with transverse stiffening-flanges $n'\ n'$, arranged parallel with the marginal flanges and intersecting each other at right angles. Said stiffening-flanges are formed by plates which are secured to the web-plate and to the frame members $n\ n$ by angle-irons. Said stiffening-flanges are so arranged with respect to the marginal flanges as to form between them spaces adapted to receive a certain number of the counterweight-blocks M. The web-plate will be made of such size as to receive the maximum number of counterweight-blocks that may be required for the bridge-span, and exact adjustment of the counterbalance-weight to the requirements of the span is afforded by leaving off a required number of the blocks in case the maximum number provided for be not needed. The drawing Fig. 8 shows the web as provided with less than its full complement of blocks.

A counterbalance-weight consisting of a web-plate provided with bolt-apertures and a plurality of weights adapted to be secured by bolts to said plate may be applied or attached to a truss in a variety of ways, and the same is herein broadly claimed without restriction to the particular manner in which it is attached to the truss or truss members. Certain details of construction in said counterbalance-weight are, however, also herein claimed as part of our invention.

It is to be understood that changes may be made in the structural details described without departing from the spirit of our invention, and we do not wish to be limited to such details, except as hereinafter made the subject of specific claims.

We claim as our invention—

1. A bascule-bridge span consisting of trusses, and two decks or floors arranged one above the other.

2. A rolling lift-bridge span comprising trusses, rolling segments attached to the trusses, and two decks or floors arranged one above the other.

3. A double-deck bascule-bridge comprising trusses, a lower bridge-floor located at the level of the lower chords of the trusses and an upper bridge-floor located at the level of the upper chords of said trusses.

4. A double-deck bascule-bridge comprising a lifting span having upper and lower floors, and a bridge-approach having two corresponding floors or roadways, the span-floors being arranged to project toward the approach beyond the supports of the span and to move downwardly away from the approach floors or roadways in the lifting of the span.

5. A double-deck bascule-bridge comprising a lifting span having upper and lower floors and rolling segments, stationary supports on which said segments rest and roll and a bridge-approach having two corresponding floors or roadways; said floors being arranged to extend toward the approach past the points at which the segments rest on their supports, so that the ends of said span-floors move downwardly away from the adjacent ends of the approach in lifting the span.

6. A double-deck bascule-bridge comprising a lifting span provided with two decks, located one above the other, and a bridge-approach having two corresponding floors or roadways.

7. A double-deck bascule-bridge comprising a lifting span provided with two decks and with rolling segments resting on stationary supports, and a bridge-approach having two corresponding floors or roadways.

8. A double-deck bascule-bridge comprising a lifting span provided with two decks and a bridge-approach having two corresponding floors or roadways, the upper one of which extends beyond or overhangs the lower one.

9. A double-deck bascule-bridge comprising a lifting span provided with two floors located one above the other and an approach having two corresponding floors or roadways, the ends of the span-floors which meet the approach floors or roadways being extended past the support by which the span is sustained and the end of the lower span-floor which meets the lower approach or roadway being extended past the adjacent end of the upper span-floor to a point outside of the path of the said end of the upper span-floor.

10. A rolling lift-bridge comprising a bridge-span provided with two floors located one above the other and provided with rolling segments which rest on stationary supports, and an approach having two corresponding floors or roadways, the ends of the span-floors which meet the approach floors or roadways being extended beyond the supporting-points of the rolling segments and the end of the lower span-floor which meets the lower approach or roadway being extended past the adjacent end of the upper span-floor to a point outside of the path of said end of the upper span-floor.

11. A rolling lift-bridge comprising a bridge-span provided with two floors located one above the other and provided with rolling segments which rest and roll on stationary supports, and an approach having two corresponding floors or roadways, the end of the lower span-floor which meets the lower approach floor or roadway being extended beyond the adjacent end of the upper span-floor, while the upper approach-floor overhangs the end of the lower approach floor or roadway, and an approach structure embracing columns which support the upper approach-floor and trusses which are attached to and extend outside of said columns and support the overhanging end of the said upper approach-floor.

12. A double-deck bascule-bridge comprising a lifting span provided with two decks and a bridge-approach having two corresponding stationary floors or roadways, the upper one of which extends beyond or overhangs the lower one and columns which support the upper approach-floor and trusses which are attached to and extend outside of said columns to support the overhanging end of the upper approach-floor.

13. A bascule-bridge comprising a bridge-span provided with two floors located one above the other, and an approach having two corresponding floors or roadways, the end of the lower span-floor which meets the lower approach being extended beyond the adjacent end of the upper span-floor, while the upper approach-floor overhangs the end of the lower approach floor or roadway, and an approach structure embracing supporting-columns, upper and lower longitudinal truss members attached to and extending beyond the said columns, oblique truss members extending from the tops of the columns outwardly and downwardly to the ends of the lower truss members, other oblique truss members extending upwardly and outwardly from the ends of the lower truss members to the outer ends of the upper truss members and a transverse girder attached to the upper ends of said upwardly and outwardly extending oblique truss members, for supporting the overhanging end of the said upper approach-floor.

14. A bascule-bridge comprising a bridge-span provided with two floors located one above the other, and an approach having two corresponding floors or roadways, the end of the lower span-floor which meets the lower approach floor or roadway being extended beyond the adjacent end of the upper span-floor, while the upper approach-floor overhangs the end of the said lower approach floor or roadway and an approach structure embracing anchored columns which support the upper approach-floor and trusses which are attached to and extend outwardly from the said columns to support the overhanging end of the said upper approach-floor, said span being provided with parts which project beyond the rolling segments and are provided with upwardly-facing stops adapted for contact with said trusses on the approach structure to limit the descent of the free end of the span.

15. A bascule-bridge comprising a span provided with parts which project beyond the support at the abutment end of the span and are provided with upwardly-facing stops, and anchored columns on the bridge-approach provided with downwardly-facing stops located in position for contact with the stops on said projecting parts of the span, and with oblique struts extending from said stops to the upper ends of said columns.

16. A rolling lift-bridge span comprising trusses, two floors located one above the other, and rolling segments attached to said trusses and adapted to rest and roll on stationary supports, said floors being extended past the rolling segments at the abutment ends of the span and the trusses being provided with projecting parts located above the level of said supports for said rolling segments and which extend beyond the said roller segments and support the end portions of said floors.

17. A rolling lift-bridge span comprising trusses and two bridge-floors supported thereby one above the other, said span being provided with rolling segments which rest and roll on stationary supports, said bridge-floors extending at the abutment end of the span beyond the said rolling segments and the trusses being provided with parts which extend beyond the said rolling segments to support the end portions of the floors, and counterbalance-weights attached to the said parts of the trusses between the floors and exterior to the said rolling segments.

18. A bascule-bridge span comprising trusses having horizontal top chords and curved bottom chords which are downwardly inclined at the abutment ends of the span, and upper and lower bridge roadways or floors, rolling segments attached to said trusses below the level of the lower roadway or floor, said trusses having extensions to support the end portions of the bridge-floors which extend past the said rolling segments, said extensions embracing lower horizontal truss members attached to the upper ends of the rolling segments and connected with the upper chords by truss members, and counterbalance-weights attached to said trusses in the same plane therewith and between the said horizontal truss members and the top chords.

19. A bascule-bridge comprising a bridge-span embracing trusses and two bridge-floors supported thereby one above the other, said bridge-floors being extended at the abutment end of the span beyond the span-supports and the abutment end of the lower bridge-floor being extended beyond that of the upper one, and the said trusses having extensions to support the end portions of the bridge-floors which extend past the said supports, said truss extensions embracing lower horizontal truss members which extend beyond the adjacent ends of the top chords of the trusses and are connected with said top chords by truss members, approach floors or roadways, of which the upper overhangs the lower one, an approach structure embracing anchored columns, and trusses projecting outwardly therefrom to support the overhanging end of the upper approach-roadway, said trusses embracing oblique struts which extend outwardly and downwardly from the upper ends of said anchored columns, downwardly-facing stops attached to the said trusses of the approach structure at the lower ends of said oblique struts, and upwardly-facing stops on the bridge-span attached to the ends of the said lower horizontal members of the truss extensions of said span.

20. A bascule-bridge comprising a span having rolling segments, stationary supports on which the said segments rest and roll, and means for actuating the said span comprising an operating-strut pivoted to the span at a point above the rolling segments and nearer the free end of the span than the forward or outer ends of said segments and their supports and means on the bridge approach or abutment for actuating said operating-strut to move the span.

21. A bascule-bridge span provided with a support near its abutment end, an operating-strut pivotally connected with said span and provided with a toothed rack-bar, a rotative gear-pinion meshing with said rack-bar to give endwise motion thereto and a guide-girder provided with a curved guide-surface for engagement with a guide-roller on said strut.

22. A rolling lift-bridge comprising a span provided with rolling segments adapted to rest on stationary supports, an operating-strut pivotally connected to said span and provided with a toothed rack-bar, a rotative gear-pinion meshing with the rack-bar on said operating-strut to give endwise motion thereto, a guide-girder provided with a curved guide-surface and a guide-roller on the operating-strut adapted for engagement with said curved guide-surface in the endwise movement of the strut.

In testimony that we claim the foregoing as our invention we affix our signatures, in presence of two witnesses, this 15th day of November, A. D. 1901.

ALBERT H. SCHERZER.
CHARLES F. T. KANDELER.

Witnesses:
C. CLARENCE POOLE,
WILLIAM L. HALL.